(12) United States Patent
Hallundbæk

(10) Patent No.: US 6,225,719 B1
(45) Date of Patent: *May 1, 2001

(54) LONG ELECTRICAL MOTOR

(75) Inventor: Jørgen Hallundbæk, Allerød (DK)

(73) Assignee: Welltec ApS, Allerod (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,534

(22) PCT Filed: Nov. 21, 1997

(86) PCT No.: PCT/DK97/00536

§ 371 Date: Jul. 9, 1999

§ 102(e) Date: Jul. 9, 1999

(87) PCT Pub. No.: WO98/24166

PCT Pub. Date: Jun. 4, 1998

(30) Foreign Application Priority Data

Nov. 22, 1996 (DK) .................................................. 1338/96

(51) Int. Cl.$^7$ ................................ H02K 5/16; H02K 7/08
(52) U.S. Cl. ................................ 310/90; 310/87; 310/91; 310/112
(58) Field of Search ................................ 310/90, 87, 157, 310/261, 112, 126; 411/353; 384/275; 417/365

(56) References Cited

U.S. PATENT DOCUMENTS

| | | | | |
|---|---|---|---|---|
| Re. 28,094 | * | 7/1974 | Boyd | 310/90 |
| 2,205,783 | * | 6/1940 | Arutunoff | 310/90 |
| 2,315,917 | * | 4/1943 | Arutunoff | 310/90 |
| 3,136,905 | * | 6/1964 | Zapt et al. | 310/90 |
| 3,506,861 | * | 4/1970 | Boyd | 310/90 |
| 3,551,714 | * | 12/1970 | Boyd | 310/87 |
| 4,453,099 | * | 6/1984 | Flat | 310/87 |
| 4,638,198 | * | 1/1987 | Cochran | 310/90 |
| 5,128,573 | * | 7/1992 | Liu et al. | 310/87 |

* cited by examiner

Primary Examiner—Elvin Enad
(74) Attorney, Agent, or Firm—Nath & Associates PLLC; Gary M. Nath; Harold L. Novick

(57) ABSTRACT

A long electrical motor mainly for submersible use having a high efficiency, being mechanically stable, capable of being assembled under low time consumption at low costs, and which is easy to maintain and repair. The long motor has a rotor divided into sections with at least one low friction bearing arranged between the sections and in each end of the long motor. A stator is stacked continuously past internal bearings using thin sheets of metal discs between the bearings. Each disc in the bearing pedestal is significantly thicker than the common stator discs and is made of paramagnetic metal with good heat transfer properties. The inner diameter of each disc in the bearing pedestal is smaller than the inner diameter of the common stator discs so that a bearing inserted into the bearing pedestal is held by a tight fit. The inner diameter of the bearing fits tightly to the axis of the rotor and slots for the stator windings in all metal discs are radially open towards the rotor.

5 Claims, 4 Drawing Sheets

LONG ELECTRICAL MOTOR

FIELD OF THE INVENTION

The present invention refers to a long electrical motor, where the rotor is divided into sections with at the least one low friction bearing arranged between the sections and in each end of the motor, whereby the stator is stacked continuously past the internal bearings, using thin sheet of either magnetic or non-magnetic metal discs in the areas surrounding the bearings, and thin sheets of magnetic metal discs between the bearings.

BACKGROUND OF THE INVENTION

Such a long electrical motor is known from U.S. Pat. No. 2,251,816, where the bearings are arranged in a groove in the rotor and consequently are made up of bearing rings that might be split in two half bearing rings held in place by butterfly keys. Such rings might contain a roller bearing in an internal groove for reducing the friction. The production and mounting of such bearings is elaborate and time consuming and therefor expensive. Further, the heat transfer properties are dependent on the stator, as the bearing rings are supported directly by the stator.

Another long electrical motor type is known from U.S. Pat. No. 3,136,905 and from DE-B 885 279, where the stator is divided in sections by bearing parts being much thicker than the single stator disc, but where the windings of the stator are cut off by the bearing parts and are not passing from one end to the other of the long electrical motor. Further, in U.S. Pat. No. 3,136,905 the bearings are not of a "low friction" type. Such motors is also very complicated to assemble and has a low degree of reliability due to the complicated production of the stator windings. This construction, also, ends up with a bad efficiency, as the magnetic flux is scattered by the relatively large gaps in the stator windings.

Further, a long electrical motor is known from U.S. Pat. No. 3,136,905, where the bearings are defined directly by the stacked discs between the sections. Those discs are thus made from a material that is not well suited for the purpose of defining a bearing with an uncontrolled friction. A bearing made of what could be regarded as a laminated material will under a relatively large friction provide a non-uniform wearing surface, thereby making a pattern of abrasion in the rotating axis. The friction causing an increase in the temperature is dependent on good heat transfer properties of the bearings. Such good heat transfer properties are not present, when the bearings are made from the stacked discs, as iron (Fe) has thermal conductivity of only 72.8 J/(m.s.K).

From U.S. Pat. No. 5,128,573 another long electrical motor with multiple sections is known, where a rotor bearing and sleeve assembly is arranged between each rotor section, each bearing including a fixed key for positioning in longitudinal spacings formed as part of the stator section, to prevent rotation of the bearing during use. Such bearing is evidently not a low friction type, as the fixed key evidently is necessary.

From U.S. Pat. No. 4,638,198 still another long electrical motor with multiple sections is known, where the upper rotor section of each pair of successive rotor sections may have its lower end supported on a rotor shaft protrusion, such as a ring mounted in an annular groove of the rotor shaft, and where further a chamfer at the end of the rotor bore locks the ring in place. Although this prior art has a protrusion for the support of the lower end, this protrusion can not be characterized as a bearing of low friction type. Also, the protrusion is locked on place by a chamfer at the end of the rotor bore, which is not reducing the friction.

Finally, a long electrical motor with multiple sections in known from U.S. Pat. No. 4,453,099, where the bearing is an assembly including a sleeve, that is keyed to the shaft, an inner portion, that rotably receives the sleeve, and a flange with a periphery, that frictionally engages the stator to prevent the bearing from rotating.

The state of the art has some drawbacks in that the threadening of the stator windings all the way through the stator package is not possible or very difficult. The threadening is very time consuming and expensive, and a means for reducing the costs, when threadening the stator windings in a long electrical motor, would be most convenient. Further, the state of the art is also dependent on the friction in that the friction in the bearings is not controlled, and the efficiency is relatively low due to the large magnetic gap between rotor and stator, necessary to avoid mechanical damages when the magnetic momentum is large. Finally, the costs for production and maintenance are high. The friction can lead to heating and premature wear of the bearings and will therefore cause loss of energy and materials.

SUMMARY OF THE INVENTION

It is therefore the object of the invention to provide a long electrical motor having a high efficiency, which motor being mechanically stable with an effective cooling of the bearings can be assembled under low time consumption at low costs, and which motor is easy to maintain and repair.

This object is achieved according to the invention in, that each single discs in the bearing pedestal is significantly thicker than the common stator discs and made of a paramagnetic metal with good heat transfer properties, that the inner diameter of each disc in the bearing pedestal is smaller than the common stator discs, that the bearing is inserted in and is held by a tight fit in the bearing pedestal, whereby the inner diameter of the bearing is fitting tightly to the axis of the rotor, and that the slots for the stator windings in all the metal discs are radially open towards the rotor.

A preferred embodiment according to the invention can be found in , that the bearings are ball bearings, either thrust ball bearings and/or radial ball bearings, thereby offering the lowest possible friction for either horizontal or vertical position of the motor during use. Also the possibility of combining the thrust ball bearings and the radial ball bearings in one motor, thereby making it universally applicable, is possible on the basis of the invention. It can also be advantageous to use a roller bearing.

In the long motor according to the invention, where the threadening is accomplished relatively fast and therefor at low costs, the slots are each forming a cavetto for each winding, and it is suggested, that each string in the winding has a non-circular cross section. Thereby it is achieved, that the winding can be guided through the openings for the rotor or the bearings and thereafter being put into the slots. The non-circular cross section will with this feature secure, that the windings fill most of the cavities in the cavetto, thereby providing a large magnetic flux in the rotor. The rotor can be of any type suited for this purpose.

BRIEF DESCRIPTION OF THE DRAWINGS

Further advantageous embodiments will be mentioned in the claims. The invention will be disclosed further in the following special specification with reference to the drawings, in which it is shown on:

DETAILED DESCRIPTION

Figure 1:
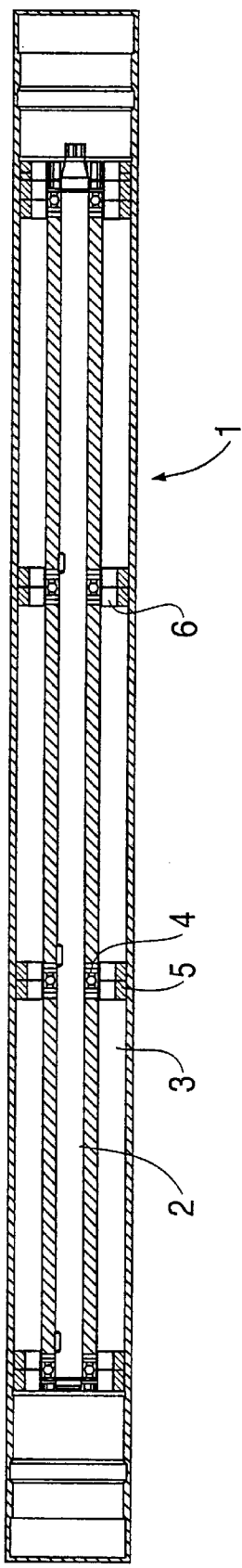
FIG. 1 a longitudinal section along the centre axis of the motor and its tools driven by the motor.

A longitudinal section along the centre axis of the long motor 1 and its tools driven by the long motor is shown in FIG. 1, where the length of the long motor is long compares to its diameter. In motors constructed according to normal practice the length and the diameter of the long motor are approximately <1:1, where in a long motor this relation could be 5:1. In the long motor shown in FIG. 1 the relation is approximately 10:1. Such motors are very difficult to stabilize against transversal forces and movements, and therefore the use of further bearings have been proposed, thereby dividing the rotor in sections.

With such division in sectors the bearings between the sectors was formed from the common stator sheets or from non-magnetic sheets with rather complicated form of bearings in order to make it possible to use the long motor in a vertical position. Examples of such motors are mentioned in the ingress of the specification.

From FIG. 1 it can be seen, that the rotor 2 is supported by bearings 4 which are suspended in bearing pedestals 5, which each are significant thicker than the common stator sheets in the stator 3. The radially open slots 6 are shown in the bearing pedestals, whereby the threadening of the stator windings are eased before the bearings are mounted.

The bearing pedestals are made of a paramagnetic metal, e.g. aluminia or copper. The varying magnetic flux will cause a heating of the bearing pedestals due to vortex-currents. Therefore, copper could be preferred as a material for the bearing pedestals, as it has a specific thermal conductivity of 401 J/(m.s.K), whereas aluminia has a specific thermal conductivity of 237 J/(m.s.K). Both metals show, however, excellent properties in thermal conductivity.

Figure 2:
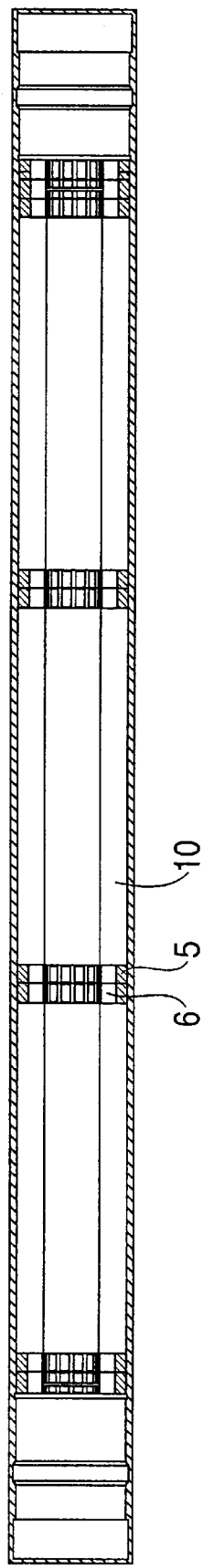
FIG. 2 a longitudinal section trough the stator.

FIG. 2 shows the stator alone built up with the bearing pedestals 5. As each stator sheet might vary in thickness due to the punching of the sheets, the stator sheets are grouped in 10 sheets so as to rotate each group 90° relative to the previous group 10. Thereby it is achieved, that the stator can be almost straight over the total length with only small deviations from a straight line. This, on the other hand, will guarantee, that the rotor can rotate very close to the stator without coming into physical contact with the stator and thereby transfer an optimum magnetic flux to the rotor.

Figure 3:
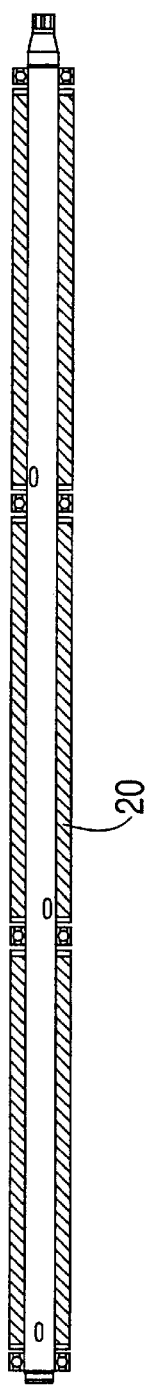
FIG. 3 a longitudinal section through the rotor.

FIG. 3 shows a rotor with bearings mounted between the sections of the rotor. The rotor can be of any type, e.g. asynchronous rotor or a permanent magnetic rotor, the latter of which, on the other hand, needs a control means. For an asynchronous rotor the windings are marked with 20.

Figure 4:
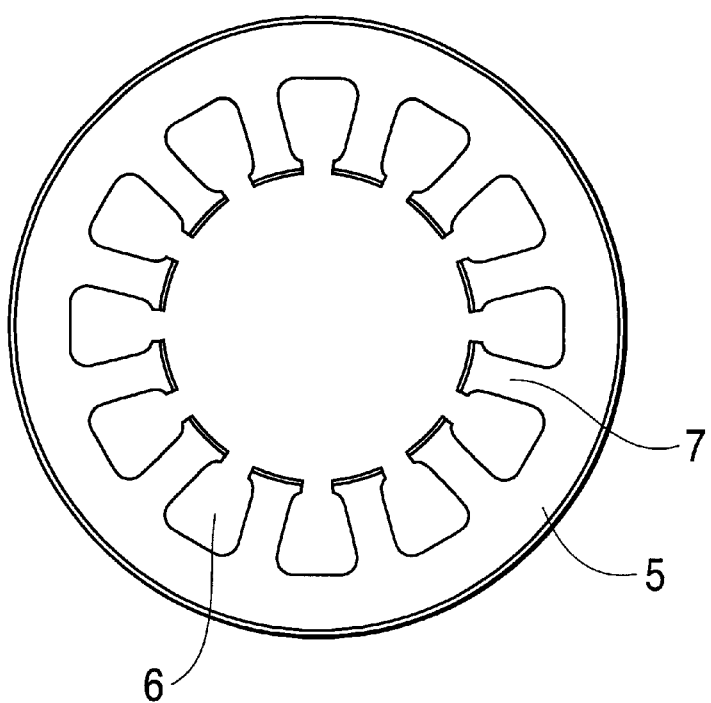
FIG. 4 a the stator pedestal seen from the end of the motor.
Figure 5:
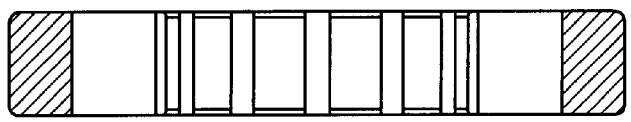
FIG. 5 a cross section through a the stator pedestal along the line V—V in FIG. 4.
Figure 6:
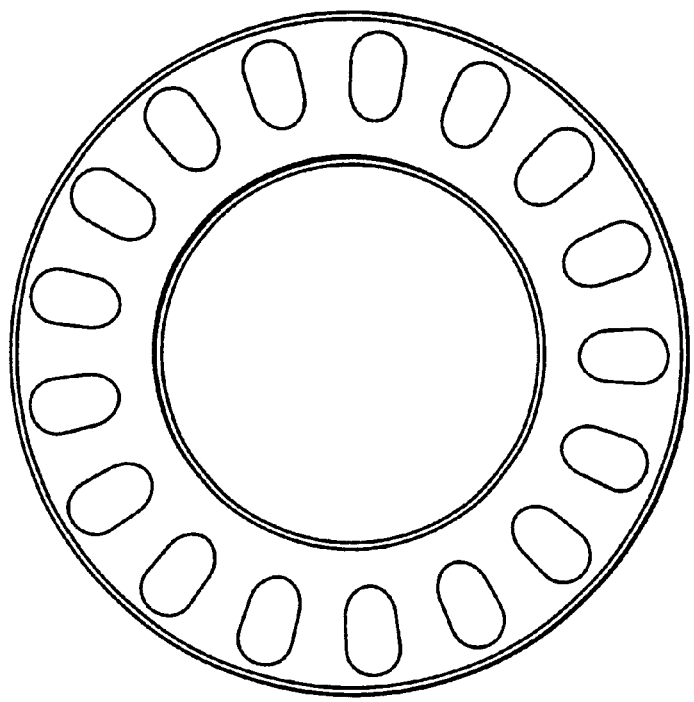
FIG. 6 a view of the one end of the rotor.
Figure 7:
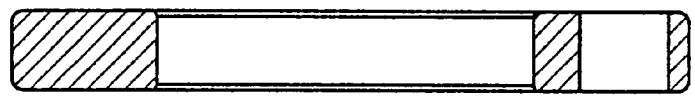
FIG. 7 a sectional view of the end of the rotor shown in FIG. 6.

FIG. 4 shows a bearing pedestal 5 as seen from the end of the long motor. The slots 6 are radially open towards the rotor. The width of the slot is not constant along a radius, and from the narrow opening towards the rotor the width increases with the depth of the slot, thus forming a cavetto for each stator winding. The "magnetic" yokes 7 are thereby made more or less constant in thickness along a radius. In this construction a bearing is fitted tight in between the yokes 7 and can be kept there due to the solid construction of the bearing pedestal 5. As mentioned above copper as well as aluminia can be used as a material for the bearing pedestal, and with these metals it is secured, that the heat developed, can be removed through the bearing pedestal 5.

What is claimed is:

1. A long motor comprising:
    a rotor divided into sections with at least one low friction bearing arranged between the sections and in each end of the long motor, whereby a stator is stacked continuously past internal bearings, using thin sheets of metal discs in the area surrounding the bearings, and thin sheets of magnetic metal discs between the bearings wherein each single metal disc in the bearing pedestal is significantly thicker than the common stator metal discs and made of a paramagnetic metal with good heat transfer properties, that the inner diameter of each metal disc in the bearing pedestal is smaller than the inner diameter of the common stator metal discs, that the bearing is inserted in and held by a tight fit in the bearing pedestal, whereby the inner diameter of the bearing is fitting tightly to the axis of the rotor, and that slots for the stator windings in all the metal discs are radially open towards the rotor.

2. Electrical motor according to claim 1, characterized in, that the bearings (4) are ball bearings.

3. Electrical motor according to claim 1, characterized in, that the bearings (4) are thrust ball bearings and/or radial ball bearings.

4. Electrical motor according to claim 1, characterized in, that the bearings (4) are roller bearings.

5. Electrical motor according to claim 1 wherein threads in the winding have a noncircular cross section.

* * * * *

UNITED STATES PATENT AND TRADEMARK OFFICE
CERTIFICATE OF CORRECTION

PATENT NO. : 6,225,719 B1
DATED : May 1, 2001
INVENTOR(S) : J. Hallundbaek

It is certified that error appears in the above-identified patent and that said Letters Patent is hereby corrected as shown below:

Please replace the claims with the following claims:
1. A long motor having a first and second end comprising:
a rotor divided into sections;
at least one low friction bearing arranged between the sections and in each end of the long motor;
a stator stacked continuously past internal bearings, said stator comprising thin sheets of metal discs in the areas surrounding the bearings, and thin sheets of magnetic metal discs between the bearings;
a laminated bearing pedestal comprising metal discs that are significantly thicker than a thickness of the common stator metal discs, said bearing pedestal metal disks being made of a paramagentic metal with good heat transfer properties, the inner diameter of each metal disc in the bearing pedestal being smaller than an inner diameter of the common stator metal discs;
wherein the bearing is inserted into an opening defined by said inner diameter of said bearing pedestal metal disks and held in a stationary position by a tight fit between an outer surface of said bearing and an inner surface of the bearing pedestal, and whereby an inner surface of the bearing is tightly to an exterior surface of the rotor's shaft.
2. The long motor according to claim 1 wherein the bearing comprise ball bearings.
3. The long motor according to claim 1 wherein the bearings comprise thrust ball bearings and/or radial ball bearings.
4. The long motor according to claim 1 wherein the bearings comprise roller bearings.
5. The long motor according to claim 1 wherein the threads in the winding have a noncircular cross section.

Signed and Sealed this

Twenty-seventh Day of November, 2001

*Attest:*

*Attesting Officer*

NICHOLAS P. GODICI
*Acting Director of the United States Patent and Trademark Office*